(12) United States Patent
Lee et al.

(10) Patent No.: US 9,733,502 B2
(45) Date of Patent: Aug. 15, 2017

(54) CURVED DISPLAY DEVICE

(71) Applicant: Samsung Display Co., Ltd, Yongin-si, Gyeonggi-do (KR)

(72) Inventors: Sang-Myoung Lee, Seoul (KR); Hyun-Ho Kang, Ansan-si (KR); O Sung Seo, Seoul (KR); Seung Jun Yu, Cheonan-si (KR); Ha Won Yu, Suwon-si (KR); Ki Kyung Youk, Bucheon-si (KR); Yeo Geon Yoon, Suwon-si (KR); Tae Kyung Yim, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/051,514

(22) Filed: Feb. 23, 2016

(65) Prior Publication Data

US 2016/0249464 A1 Aug. 25, 2016

(30) Foreign Application Priority Data

Feb. 25, 2015 (KR) ........................ 10-2015-0026808

(51) Int. Cl.
*G06F 1/16* (2006.01)
*G02F 1/1333* (2006.01)
*G09F 9/30* (2006.01)

(52) U.S. Cl.
CPC ............ *G02F 1/1333* (2013.01); *G09F 9/301* (2013.01)

(58) Field of Classification Search
CPC ............ G02F 1/133305; G02F 1/1333; G02F 2001/133302; G02F 1/133603; G02F 2001/133314; G02F 2001/13332; G02F 2202/02; H05K 5/0017; H05K 2201/10128; H05K 5/02; H05K 5/0204; H05K 2201/10106; H05K 2201/10136; G09F 9/301; G09F 2007/1843; G06F 1/1637; G06F 1/1652; G06F 1/16; G06F 1/1601
USPC ................................. 361/679.01; 349/58–60
See application file for complete search history.

(56) References Cited

U.S. PATENT DOCUMENTS

| | | | |
|---|---|---|---|
| 7,315,336 B2 * | 1/2008 | North ...................... | G06F 3/043 349/58 |
| 2013/0321740 A1 * | 12/2013 | An ........................ | H05K 5/0217 349/58 |
| 2014/0016302 A1 * | 1/2014 | Shin ..................... | H05K 5/0017 362/97.1 |
| 2014/0055696 A1 | 2/2014 | Lee et al. | |

FOREIGN PATENT DOCUMENTS

| | | |
|---|---|---|
| JP | 10-268245 A | 10/1998 |
| JP | 4684881 | 2/2011 |
| KR | 10-1319543 B1 | 10/2013 |

* cited by examiner

*Primary Examiner* — Anthony Haughton
*Assistant Examiner* — Ingrid Wright
(74) *Attorney, Agent, or Firm* — Innovation Counsel LLP

(57) ABSTRACT

An exemplary embodiment provides a curved display device in which occurrences of black mura are prevented or otherwise reduced. The curved display device according to the exemplary embodiment includes a curved display panel displaying images; a rear surface cover covering and supporting a rear surface of the curved display panel; and a flexible front surface chassis supporting the curved display panel.

15 Claims, 5 Drawing Sheets

CURVED DISPLAY DEVICE

CROSS-REFERENCE TO RELATED APPLICATION

This application claims priority to and the benefit of Korean Patent Application No. 10-2015-0026808 filed in the Korean Intellectual Property Office on Feb. 25, 2015, the entire contents of which are incorporated herein by reference.

BACKGROUND (a) Field of the Disclosure

The present disclosure relates to a curved display device in which occurrences of black mura are prevented.

(b) Description of the Related Art

Presently one of the most widely used flat panel displays, a liquid crystal display (LCD) includes two display panels on which field generating electrodes, such as a pixel electrode and a common electrode, are formed and a liquid crystal layer interposed between the two display panels. The LCD displays an image by applying a voltage to the field generating electrodes to generate an electric field in the liquid crystal layer, thereby determining alignment directions of liquid crystal molecules of the liquid crystal layer and controlling polarization of incident light.

Recently, LCDs are becoming larger and are also being developed as a curved type of display device (a curved display device) to enhance viewer engagement and provide a more realistic experience. For example, a curved display device may be manufactured to have a constant curvature by applying external force to a flat liquid crystal panel. In doing so, phase retardation of the glass substrate of the display device occurs due to the shear stress of forming the curvature, and as a result, black mura occurs.

Black mura generally refers to blemishes that are displayed brighter due to light leakage when the curved display device displays a black screen. Such black mura deteriorates the display quality of the curved display device.

The above information disclosed in this Background section is only to enhance the understanding of the background of the disclosure and therefore may contain information that does not form the prior art that is already known in this country to a person of ordinary skill in the art.

SUMMARY

The present disclosure provides a curved display device in which occurrences of black mura are prevented or otherwise reduced.

An exemplary embodiment provides a curved display device, including: a curved display panel displaying images; a rear surface cover covering and supporting a rear surface of the curved display panel; and a flexible front surface chassis supporting the curved display panel.

The curved display panel may curve as a result of sagging due to its own weight, the rear surface cover may include a supporting wall supporting the curved display panel by directly contacting the curved display panel, and the supporting wall may have the same curvature as that of the curved display panel.

The front surface chassis may be made from at least one selected from a group consisting of polyurethane (PU), polyethylene (PE), and polyvinyl chloride (PVC).

A difference between a stress applied to an edge portion of the curved display panel that directly contacts the front surface chassis, and a stress applied to a center of the curved display panel may be within about 5% of the stress applied to the edge portion.

The curved display panel may include a first region that has a first curvature, a second region that has a second curvature different from the first curvature and is disposed at an outer side of the first region, and a third region that has a curvature equal to the first curvature and is disposed at an outer side of the second region, and a curvature radius of the second curvature may be greater than that of the first curvature.

The curvature radius of the second curvature may be about 1.05 to 1.2 times that of the first curvature, and the curved display panel may include a first region that has a first curvature, a second region that has a second curvature different from the first curvature and is disposed at an outer side of the first region, and a third region that has a third curvature different from the first and second curvatures and is disposed at an outer side of the second region.

A curvature radius of the second curvature may be greater than that of the first curvature, and a curvature radius of the third curvature may be greater than that of the first curvature but may be smaller than that of the second curvature.

The curved display panel may include a liquid crystal or an organic light emitting element.

Another embodiment provides a manufacturing method of a curved display device, including: forming a flat plate type of a curved display panel, mounting the curved display panel on a rear surface cover of which upper ends of outer sides thereof are formed to curve, such that the curved display panel concavely curves as a result of sagging due to its own weight, and supporting the curved display panel through a flexible front surface chassis by fixing the flexible front surface chassis to the rear surface cover.

The forming of the curved display panel so that it concavely curves when mounted may include forming, at the curved display panel, a first region that has a first curvature, a second region that has a second curvature that is greater than the first curvature and is disposed at an outer side of the first region, and a third region that has a curvature equal to the first curvature and is disposed at an outer side of the second region.

The forming of the curved display panel so that it concavely curves when mounted may include forming, at the curved display panel, a first region that has a first curvature, a second region that has a second curvature different from the first curvature and is disposed at an outer side of the first region, and a third region that has a third curvature different from the first and second curvatures and is disposed at an outer side of the second region. A curvature radius of the second curvature may be greater than that of the first curvature, and a curvature radius of the third curvature may be greater than that of the first curvature but may be smaller than that of the second curvature.

According to the exemplary embodiments, a curved display device in which black mura does not occur may be formed.

DETAILED DESCRIPTION OF THE EMBODIMENTS

Figure 1:
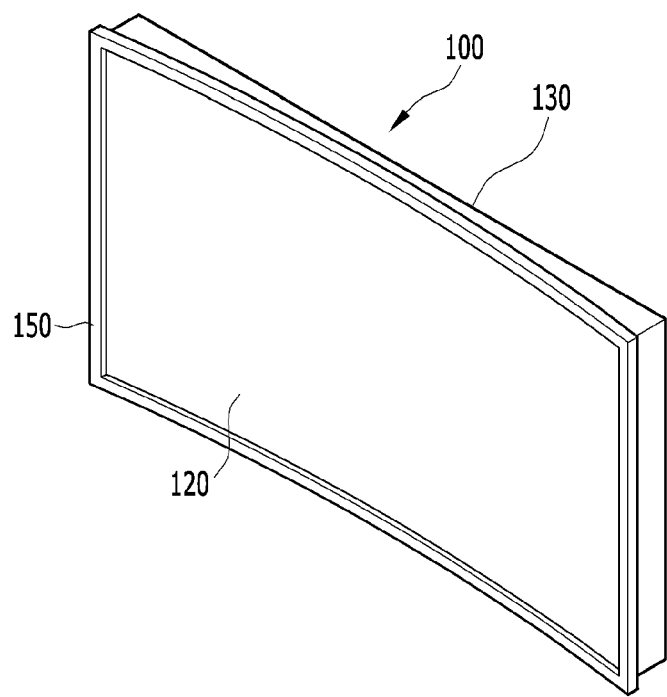
FIG. 1 is a perspective view of a curved display device according to an exemplary embodiment.

The present disclosure is described more fully hereinafter with reference to the accompanying drawings in which exemplary embodiments of the disclosure are shown.

As those skilled in the art would realize, the described embodiments may be modified in various different ways, all without departing from the spirit or scope of the present disclosure.

Further, in various exemplary embodiments, since like reference numerals designate like elements having the same configuration, a first exemplary embodiment is representatively described, and in other exemplary embodiments, only different configurations from the first exemplary embodiment are described.

Parts that are irrelevant to the description are omitted to more clearly describe the present disclosure. The same or similar constituent elements are designated by the same reference numerals throughout the specification.

Throughout this specification and the claims that follow, when it is described that an element is "coupled" to another element, the element may be "directly coupled" to the other element or "electrically coupled" to the other element through a third element.

In addition, unless explicitly described to the contrary, the word "comprise," and variations such as "comprises" or "comprising," are understood to imply the inclusion of stated elements but not the exclusion of any other elements.

In the drawings, the thickness of layers, films, panels, regions, etc., are exaggerated for clarity.

Like reference numerals designate like elements throughout the specification.

It is understood that when an element such as a layer, film, region, or substrate is referred to as being "on" another element, it may be directly on the other element, or intervening elements may also be present.

In contrast, when an element is referred to as being "directly on" another element, there are no intervening elements present.

A curved display device according to an exemplary embodiment is now described in detail with reference to the drawings.

Figure 2:
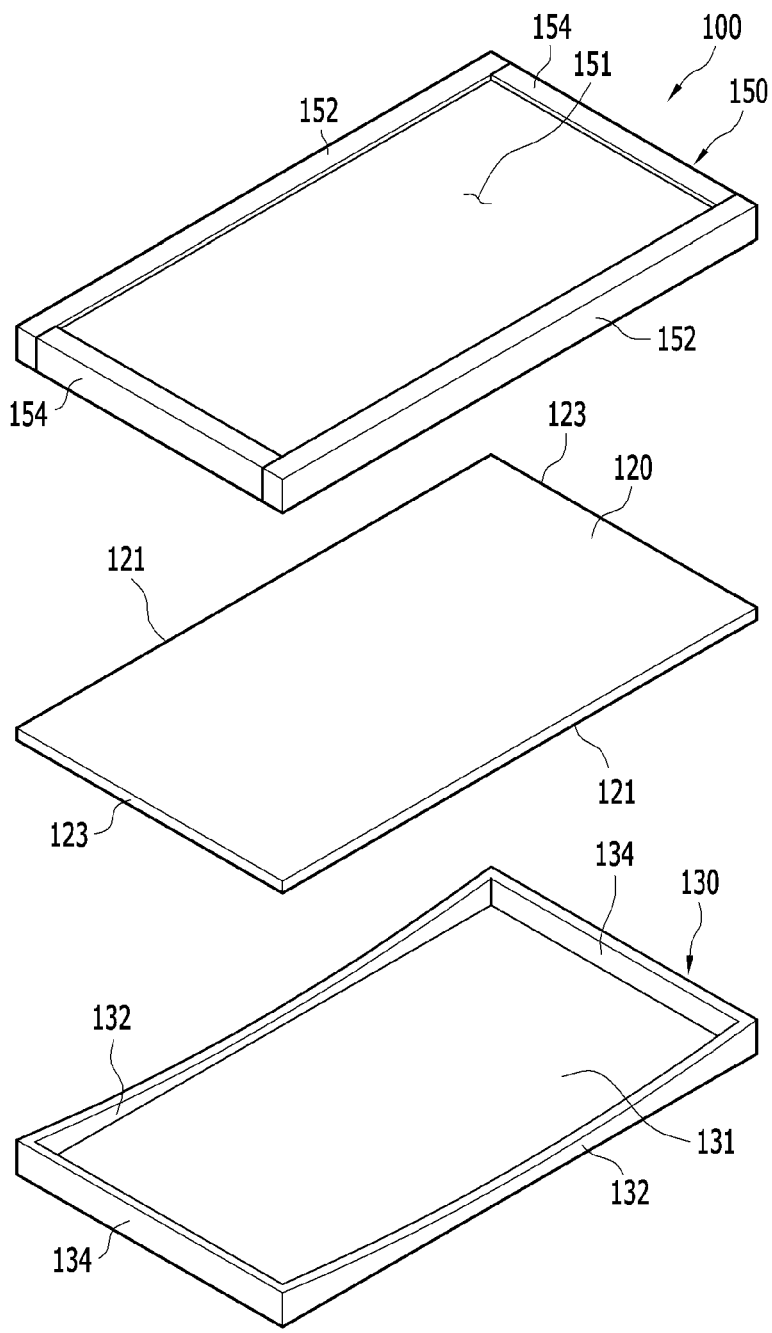
FIG. 2 is an exploded perspective view of a curved display device according to an exemplary embodiment.

FIG. 1 is a perspective view of a curved display device according to an exemplary embodiment of the present disclosure. FIG. 2 is an exploded perspective view of a curved display device according to an exemplary embodiment.

FIGS. 1 and 2, a curved display device 100 includes a curved display panel 120 displaying images, a rear surface cover 130 covering and supporting a rear surface of the curved display panel 120, and a flexible front surface chassis 150 supporting the curved display panel 120.

The curved display panel 120 may be formed as a liquid crystal panel containing liquid crystals, and may be made as an organic light emitting panel including an organic light emitting element.

The curved display panel 120 includes a plurality of gate lines, a plurality of data lines, and a plurality of pixels to display images, such as, motion pictures, images, texts, and so on.

Hereinafter, a rear surface cover 130 is described.

Figure 3:
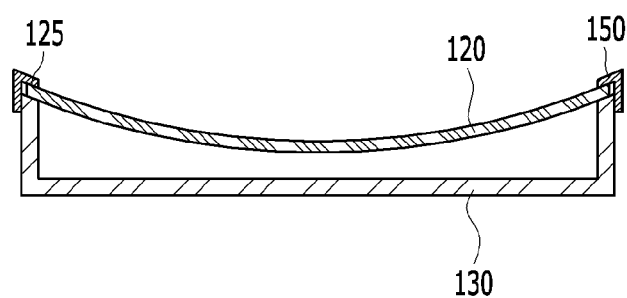
FIG. 3 is a cross-sectional view of a curved display device according to a first exemplary embodiment.

FIG. 3 is a vertical cross-sectional view of a curved display device according to an exemplary embodiment.

Referring to FIGS. 2 and 3, the curved display panel 120 has a curved shape, for example, a concave or convex shape.

With respect to a viewer, the concave shape has a shape in which a center portion of the curved display panel 120 is disposed to retract from opposite lateral edges, while the convex shape has a shape in which a center portion of the curved display panel 120 is disposed to protrude from opposite lateral edges. That is, the curved display panel 120 having the concave shape curves toward the viewer, and the curved display panel 120 having the convex shape curves away from the viewer.

As shown in FIG. 2, the curved display panel 120 is initially manufactured as a flat plate shape, and then is mounted on the rear surface cover 130 so that it curves under its own weight.

The rear surface cover 130 includes a rear surface supporting plate 131 having a quadrangular plate shape, and two first supporting walls 132 and two second supporting walls 134 protruded from the rear surface supporting plate 131.

The first supporting walls 132 are disposed to face each other and to contact an upper end and a lower end of the curved display panel 120.

Upper ends of the first supporting walls 132 are formed to have a concavely curved shape toward the center of the curved display panel 120.

The second supporting walls 134 are disposed to face each other and to contact lateral ends of the curved display panel 120.

Upper ends of the second supporting walls 134 are formed in a straight line form.

A power supply, a back light controlling luminance of images, and circuit elements are provided between the rear surface cover 130 and the curved display panel 120.

Next, the curved display panel 120 is described.

Figure 4:
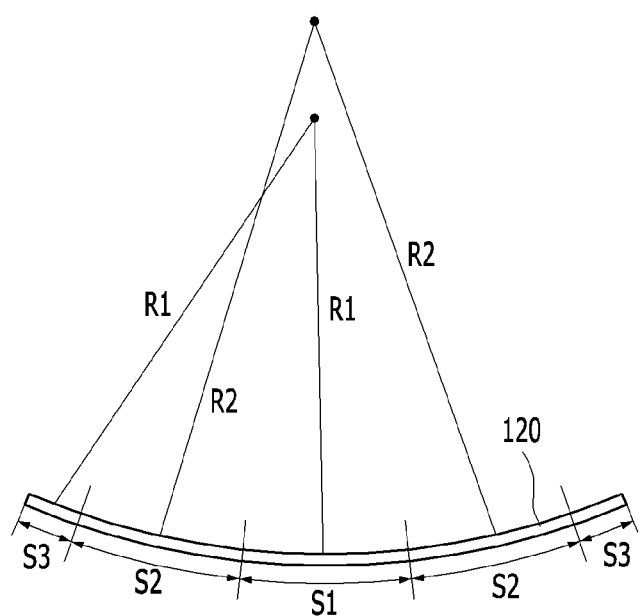
FIG. 4 is a cross-sectional view of a curved display panel according to a first exemplary embodiment.

FIG. 4 is a cross-sectional view of a curved display panel according to an exemplary embodiment.

Referring to FIGS. 2, 3, and 4, the curved display panel 120 is mounted on the rear surface cover 130 so as to curve under its own weight.

The curved display panel 120 includes a first region S1 that has a first curvature, a second region S2 that has a second curvature and is disposed at an outer side of the first region S1, and a third region S3 that has a curvature equal to the first curvature and is disposed at an outer side of the second region S2.

The curved display panel 120 includes a lateral surface 121 along its length direction and a lateral surface 123 along its width direction, and the lateral surface 121 is formed to curve.

The first region S1 is formed at the center of the length direction of the curved display panel 120, and has a first curvature radius R1.

The second region S2 is disposed at the outer side of the first region S1 based on the length direction of the curved display panel 120, and has a second curvature radius R2 that is greater than the first curvature radius R1.

Further, the third region S3 is disposed at the outer side of the second region S2 based on the length direction of the curved display panel 120, and has the first curvature radius R1.

Accordingly, the second region S2 is disposed between the first region S1 and the third region S3.

The curvature radius R2 of the second curvature may be about 1.05 to 1.2 times the curvature radius R1 of the first curvature.

When a curved display panel 120 with a flat plate shape is mounted on the rear surface cover 130, the curved display panel 120 concavely curves under its own weight.

In this case, when a curvature of the upper end of the rear surface cover 130 is a single curvature, a gap may occur between the rear surface cover 130 and the curved display panel 120.

Although a center portion and a lateral end portion of the curved display panel 120 may be supported by directly contacting the rear surface cover 130, a portion between the center portion and the lateral end portion of the curved display panel 120 may be spaced apart from the rear surface cover 130 such that a predetermined curvature may be not formed.

Further, when the curved display panel 120 partially contacts the rear surface cover 130, stress may be concentrated on the portion at which the curved display panel 120 contacts the rear surface cover 130.

To solve such a problem, the upper end of the first supporting wall 132 may be formed to have a plurality of curvatures, so that when the curved display panel 120 is disposed on the rear surface cover 130, an edge of the curved display panel 120 directly contacts the upper ends of the first supporting wall 132 and the second supporting wall 134, and the curved display panel 120 may curve in a predetermined curvature.

In this manner, the first region S1, the second region S2, and third region S3 are formed in the curved display panel 120.

A front surface chassis 150 is made of a flexible polymer material.

The front surface chassis 150 may be made of at least one selected from a group consisting of polyurethane (PU), polyethylene (PE), and polyvinyl chloride (PVC).

The front surface chassis 150 includes two first rods 152 disposed to face each other, and second rods 154 that are connected with two first rods 152 and are disposed to face each other.

The first rods 152 are disposed to directly contact a lateral surface 121 along the length direction of the curved display panel 120, and the second rods 154 are disposed to directly contact a lateral surface 123 along the width direction of the curved display panel 120.

The first rods 152 and the second rods 154 may be integrally formed, but are not limited thereto, and may be separately formed.

The front surface chassis 150 is formed in a quadrangular ring shape, and an opening 151 for displaying images is formed inside the front surface chassis 150.

The front surface chassis 150 is fixed to the rear surface cover 130 with screws (not shown) and the like to support the curved display panel 120.

Since the first rods 152 are flexible, the first rods 152 may be formed in a straight line shape and then bent to be fixed to the rear surface cover 130.

As such, when the front surface chassis 150 is made of a flexible material, stress applied to an edge portion 125 of the curved display panel 120 that contacts the front surface chassis 150 may be minimized.

The stress applied to the edge portion 125 of the curved display panel 120 that contacts the front surface chassis 150 may be the same as that applied to the center of the curved display panel 120.

Further, a difference between the stress applied to the edge portion 125 and the stress applied to the center of the curved display panel 120 may be within about 5% of the stress applied to the edge portion 125.

When stress is excessively applied to the curved display panel 120, black mura occurs. However, when the stress is removed or is reduced to a very small level according to the present exemplary embodiment, black mura may be prevented or may be reduced to a very small level.

Further, since the curved display panel 120 curves as a result of sagging due to its own weight, black mura occurring due to being bent by an external force may be reduced. Hereinafter, a manufacturing method of the curved display device is described with reference to FIGS. 2, 3, and 4.

A manufacturing method of a curved display device according to a first exemplary embodiment includes forming a flat plate type of a curved display panel 120, mounting the curved display panel 120 on a rear surface cover 130 having a curved surface such that the curved display panel 120 concavely curves as a result of sagging due to its own weight, and supporting the curved display panel 120 with a flexible front surface chassis 150 by fixing the flexible front surface chassis 150 to the rear surface cover 130.

Herein, the forming of the curved display panel 120 so that it concavely curves when mounted includes forming, in the curved display panel 120, a first region S1 that has a first curvature, a second region S2 that has a second curvature different from the first curvature and is disposed at an outer side of the first region S1, and a third region S3 that has a curvature equal to the first curvature and is disposed at an outer side of the second region S2.

In this case, a radius R2 of the second curvature may be greater than a radius R1 of the first curvature. For example, the radius R2 may be about 1.05 to 1.2 times the radius R1.

A curved display device according to a second exemplary embodiment is described with reference to FIG. 5.

Parts that are different from the first exemplary embodiment are described, and parts that are not described follow the first exemplary embodiment.

To enhance comprehension and simplify the description, the constituent elements of the second exemplary embodiment that are the same as the first exemplary embodiment have the same reference numerals.

Figure 5:
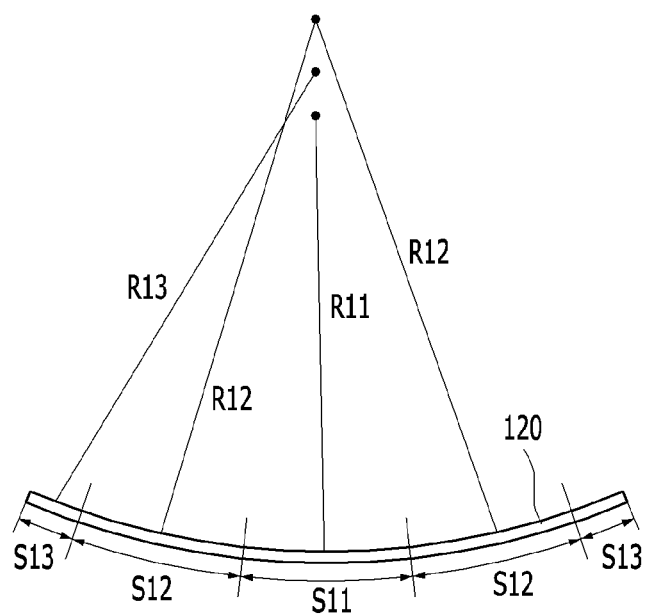
FIG. 5 is a cross-sectional view of a curved display panel according to a second exemplary embodiment.

FIG. 5 is a cross-sectional view of a curved display panel according to the second exemplary embodiment.

Referring to FIG. 5, a curved display panel 230 is supported by a rear surface cover so that it curves under its own weight. The curved display panel 230 includes a first region S11 that has a first curvature, a second region S12 that has a second curvature and is disposed at an outer side of the first region S11, and a third region S13 that has a third curvature and is disposed at an outer side of the second region S12.

The curved display panel 230 includes a lateral surface along its length direction and a lateral surface along its width direction, and the lateral surface along the length direction is curved.

The first region 11 is formed at the center of the length direction of the curved display panel 230, and has a first curvature radius.

The second region S12 is disposed at an outer side of the first region S11 along the length direction of the curved display panel 230, and has a second curvature radius R12 different from the first curvature radius R11.

Further, the third region S13 is disposed at an outer side of the second region S12 along the length direction of the curved display panel 230, and has a third curvature radius R13.

Therefore, the second region S12 is disposed between the first region S11 and the third region S13.

A radius R12 of the second curvature is greater than a radius R11 of the first curvature, and a radius R13 of the third curvature is greater than the radius R11 of the first curvature but smaller than the radius R12 of the second curvature.

The radius R12 of the second curvature may be about 1.05 to 1.2 times the radius R11 of the first curvature, and the radius R13 of the third curvature may be about 1.02 to 1.2 times the radius R11 of the first curvature or may be about 0.98 to 0.8 times the radius R12 of the second curvature.

Further, a manufacturing method of the curved display device according to the present second exemplary embodiment includes forming a flat plate type of a curved display panel 230, mounting the curved display panel 230 on a rear surface cover having a curved surface such that the curved display panel 230 concavely curves as a result of sagging due to its own weight, and supporting the curved display panel 230 with a flexible front surface chassis by fixing the flexible front surface chassis to the rear surface cover.

Herein, the forming of the curved display panel 230 so that it concavely curves when mounted includes forming, at the curved display panel 230, a first region S11 that has a first curvature, a second region S12 that has a second curvature different from the first curvature and is disposed at an outer side of the first region S11, and a third region S13 that has a third curvature different from the first and second curvatures and is disposed at an outer side of the second region S12.

In this case, a radius R12 of the second curvature may be greater than a radius R11 of the first curvature, and a radius R13 of the third curvature may be greater than the radius R11 but smaller than the radius R2.

While this disclosure has been described in connection with exemplary embodiments, it is to be understood that the disclosure is not limited to the disclosed embodiments. On the contrary, this disclosure is intended to cover various modifications and equivalent arrangements included within the spirit and scope of the appended claims.

<DESCRIPTION OF SYMBOLS>

| | |
|---|---|
| 100: curved display device | 120, 230: curved display panel |
| 121: lateral surface of a length direction | 123: lateral surface of a width direction |
| 125: edge portion | 130: rear surface cover |
| 131: rear surface supporting plate | 132: first supporting wall |
| 134: second supporting wall | 150: front surface chassis |
| 152: first rod | 154: second rod |

What is claimed is:

1. A curved display device, comprising:
   a curved display panel displaying images;
   a rear surface cover covering and supporting a rear surface of the curved display panel; and
   a flexible front surface chassis supporting the curved display panel,
   wherein a difference between a stress applied to an edge portion of the curved display panel that directly contacts the front surface chassis and a stress applied to a center of the curved display panel is within about 5% of the stress applied to the edge portion.

2. The curved display device of claim 1, wherein the curved display panel curves as a result of sagging due to its own weight.

3. The curved display device of claim 1, wherein the rear surface cover includes a supporting wall supporting the curved display panel by directly contacting the curved display panel, and the supporting wall has the same curvature as that of the curved display panel.

4. The curved display device of claim 1, wherein the front surface chassis is made of a synthetic resin material.

5. The curved display device of claim 1, wherein the front surface chassis includes at least one selected from a group consisting of polyurethane (PU), polyethylene (PE), and polyvinyl chloride (PVC).

6. The curved display device of claim 1, wherein the curved display panel includes a first region that has a first curvature, a second region that has a second curvature different from the first curvature and is disposed at an outer side of the first region, and a third region that has a curvature equal to the first curvature and is disposed at an outer side of the second region.

7. The curved display device of claim 6, wherein a curvature radius of the second curvature is greater than that of the first curvature.

8. The curved display device of claim 7, wherein the curvature radius of the second curvature is about 1.05 to about 1.2 times that of the first curvature.

9. The curved display device of claim 1, wherein the curved display panel includes a first region that has a first curvature, a second region that has a second curvature different from the first curvature and is disposed at an outer side of the first region, and a third region that has a third curvature different from the first and second curvatures and is disposed at an outer side of the second region.

10. The curved display device of claim 9, wherein a curvature radius of the second curvature is greater than that of the first curvature, and
    a curvature radius of the third curvature is greater than that of the first curvature but smaller than that of the second curvature.

11. The curved display device of claim 1, wherein the curved display panel includes a liquid crystal.

12. The curved display device of claim 1, wherein the curved display panel includes an organic light emitting element.

13. A manufacturing method of a curved display device, comprising:
    forming a flat plate type of a curved display panel,
    mounting the curved display panel on a rear surface cover of which upper ends of outer sides thereof are formed to curve, such that the curved display panel concavely curves as a result of sagging due to its own weight by; and
    supporting the curved display panel with a flexible front surface chassis by fixing the flexible front surface chassis to the rear surface cover,
    wherein a difference between a stress applied to an edge portion of the curved display panel that directly contacts the front surface chassis and a stress applied to a center of the curved display panel is within about 5% of the stress applied to the edge portion.

14. The manufacturing method of claim 13, wherein the forming of the curved display panel so that it concavely curves when mounted includes forming, at the curved display panel, a first region that has a first curvature, a second region that has a second curvature that is greater than the first curvature and is disposed at an outer side of the first region, and a third region that has a curvature equal to the first curvature and is disposed at an outer side of the second region.

15. The manufacturing method of claim 13, wherein the forming of the curved display panel so that it concavely curves when mounted includes forming, at the curved display panel, a first region that has a first curvature, a second region that has a second curvature different from the first curvature and is disposed at an outer side of the first region, and a third region that has a third curvature different from the first and second curvatures and is disposed at an outer side of the second region, and a curvature radius of the second curvature is greater than that of the first curvature, and a curvature radius of the third curvature is greater than that of the first curvature but smaller than that of the second curvature.

* * * * *